United States Patent [19]

Hasegawa

[11] Patent Number: 4,772,886

[45] Date of Patent: Sep. 20, 1988

[54] MATRIX DRIVER

[75] Inventor: Kazuo Hasegawa, Furukawa, Japan

[73] Assignee: Alps Electric Co., Ltd., Japan

[21] Appl. No.: 931,668

[22] Filed: Nov. 17, 1986

[30] Foreign Application Priority Data

Nov. 15, 1985 [JP] Japan ................................ 60-257472
Nov. 19, 1985 [JP] Japan ................................ 60-259457

[51] Int. Cl.[4] ................................................ H04Q 1/00

[52] U.S. Cl. ................................ 340/825.82; 340/804; 358/241

[58] Field of Search ................................ 307/125-130; 361/2, 52; 340/825.81, 825.82, 715, 762, 782, 791, 793; 358/213.11, 213.12, 213.17, 241, 188; 250/221, 578

[56] References Cited

U.S. PATENT DOCUMENTS

| | | | |
|---|---|---|---|
| 3,765,011 | 10/1973 | Sawyer et al. | 358/241 X |
| 4,103,290 | 7/1978 | Sekiguchi | 340/804 X |
| 4,106,283 | 8/1978 | Yamashita | 358/241 |
| 4,234,821 | 11/1980 | Kako et al. | 358/241 X |
| 4,300,138 | 11/1981 | Nakauchi et al. | 340/785 |

*Primary Examiner*—Ulysses Weldon

*Attorney, Agent, or Firm*—Guy W. Shoup; Paul J. Winters; Leighton K. Chong

[57] ABSTRACT

A matrix driver is provided, comprising a plurality of light emitting diodes, energizing means for successively pulse-driving and scanning the light emitting diodes, and control means for instructing the energizing means about the sequence of scanning, characterized by protective means for preventing one specified diode among the light emitting diodes from being continuously pulse-energized.

2 Claims, 5 Drawing Sheets

MATRIX DRIVER

BACKGROUND OF THE INVENTION

1. Field of the Invention

This invention relates to an optical coordinate input device and, more particularly, to a matrix driver for scanning, driving, and controlling individual diodes contained in a diode matrix composed of a plurality of light emitting diodes.

2. Description of the Prior Art

The optical coordinate input device comprises, for example, a light emitting element array. This array includes a plurality of light emitting diodes arranged in the form of a matrix wherein each light emitting diode is driven and caused to emit light when a row signal and a column signal pertinent thereto, serving as scanning signals, coincide in timing with each other. The light emitting diodes are driven by pulses, and the peak value of a current supplied to each diode during the scanning is made as large as some ten times the rated value during the static driving.

Examples of the foregoing type of optical coordinate input device are disclosed in U.S. Pat. Nos. 3,764,813; 3,775,560; and 3,860,754.

According to these patents, the row signals and the column signals are given each in the form of a pulse signal of square waveform. Therefore, if some malfunction occurs in a section for generating such pulse signals and a "high" level is preserved, only light emitting diodes located at row-column positions pertinent to the pulse signals kept at that level are caused to emit light continuously. As a result, the diodes would be destroyed due to continued energization, or the lifetime would be shortened.

SUMMARY OF THE INVENTION

It is an object of the present invention to provide a matrix driver for light emitting diodes which prevents continued energization of any peculiar light emitting diodes even when a signal state designating these diodes becomes abnormal.

To achieve the foregoing object, the present invention provides a matrix driver comprising a plurality of light emitting diodes, energizing means for successively pulse-driving and scanning the light emitting diodes, and control means for instructing the energizing means about the sequence of scanning, which is characterized by protective means for preventing one specified diode among the light emitting diodes from being continuously pulse-energized.

In another feature, the present invention provides a matrix driver comprising a diode matrix composed of a plurality of light emitting diodes arranged in the form of a matrix, scanning means for providing scanning signals to scan the plurality of light emitting diodes, driving means for driving and causing the designated light emitting diodes to emit light in accordance with the scanning signals, and drive terminating means for supplying a drive terminating signal to the driving means when the scanning signals come to a standstill. The drive terminating means may be a monostable multivibrator.

In still another feature, the present invention provides a matrix driver comprising a diode matrix composed of a plurality of light emitting diodes, signal supplying means for supplying a plurality of row signals and column signals, driving means for driving the light emitting diodes within the diode matrix designated by the row signals and the column signals, and drive control means for controlling the driving means so that when the row signals and the column signals become unchanged a position devoid of any light emitting diodes is designated. The matrix driver may include capacitive coupling means for supplying the row signals and the column signals to the driving means. Further, the drive control means may be monostable multivibrator circuits being actuated by the respective row signals and column signals.

DESCRIPTION OF THE PREFERRED EMBODIMENTS

Embodiments of the present invention will now be described in detail with reference to the drawings.

Figure 1:
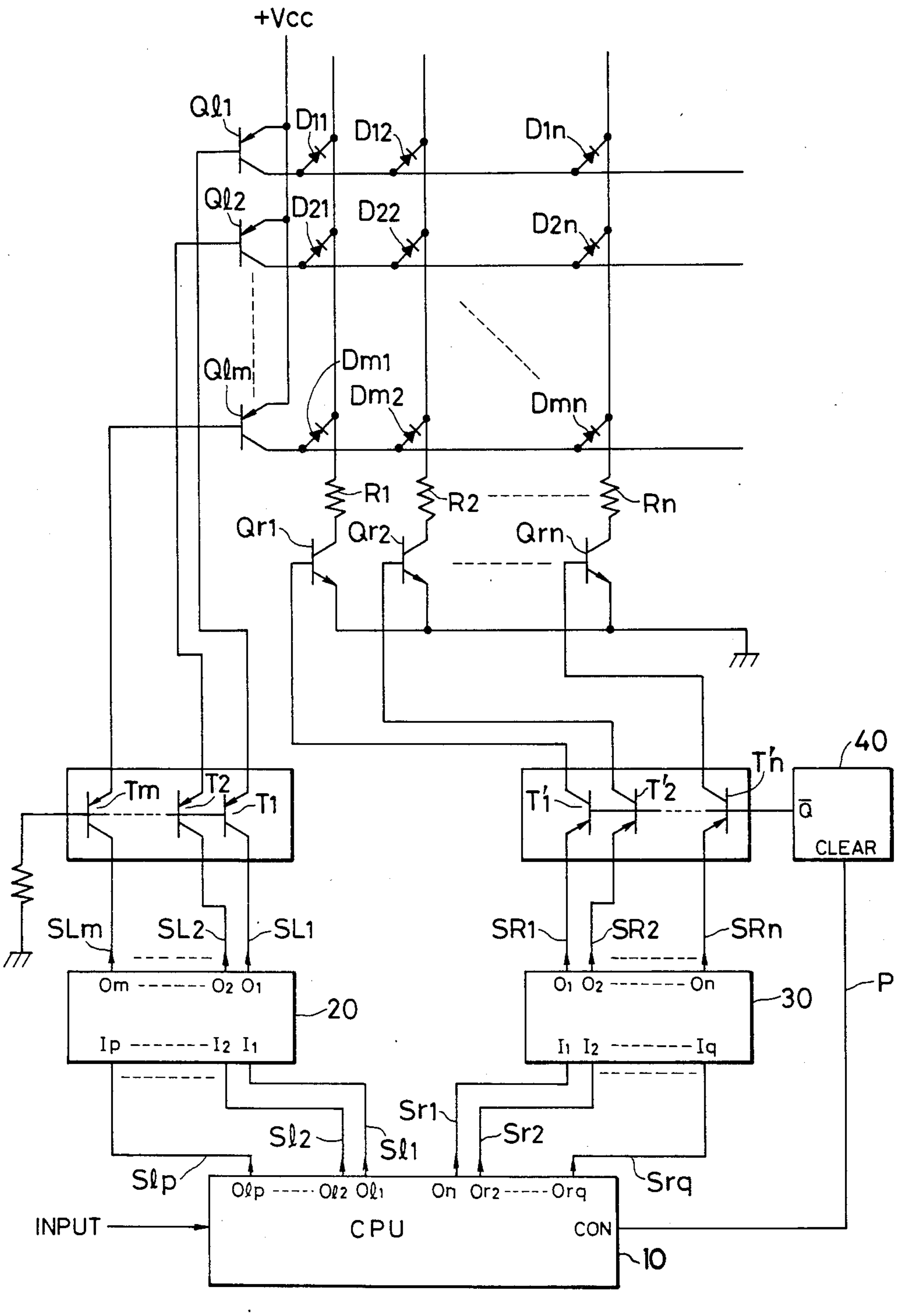
FIG. 1 is a circuit diagram showing a first embodiment of a matrix driver according to the present invention.

FIG. 1 shows a first embodiment of a matrix driver according to the present invention. The illustrated matrix driver includes a diode matrix composed of light emitting diodes D, having m rows and n columns. That is, (m×n) light emitting diodes are arranged in the form of a matrix, indicated by $D_{11}$–$D_{1n}$, $D_{21}$–$D_{2n}$, . . . , $D_{m1-mn}$.

Signals for driving and controlling these light emitting diodes D are supplied through a CPU 10. Specifically, a plurality of row control signals $Sl_1$–$Sl_p$ are provided form row signal output terminals $Ol_1$–$Ol_p$ of the CPU 10, and a plurality of column control signals $Sr_1$–$Sr_q$ are provided from column signal output terminals $Or_1$–$Or_q$ of the CPU 10. These row control signals $Sl_1$–$Sl_p$ are supplied to corresponding signal input terminals $I_1$–$I_p$ of a row address decoder 20. The column control signals $Sr_1$–$Sr_q$ are supplied to corresponding signal input terminals $I_1$–$I_q$ of a column address decoder 30.

Signal output terminals $O_1$–$O_m$ of the row address decoder 20 are connected through PNP transistors $T_1$–$T_m$ to the corresponding bases of m PNP transistors $Ql_1$–$Ql_m$ for driving the row side of the diode matrix and provide row signals $SL_1$–$SL_m$ serving as scanning signals. The bases of the transistors $T_1$–$T_m$ are connected in common and grounded.

Similarly, signal output terminals $O_1$–$O_n$ of the column address decoder 30 are connected through PNP transistors $T'_1$–$T'_n$ to the corresponding bases of n NPN transistors $Qr_1$–$Qr_n$ for driving the column side of the diode matrix and provide column signals $SR_1$–$SR_n$. The bases of the transistors $T'_1$–$T'_n$ are connected in common with a $\overline{Q}$ terminal of a re-triggerable monostable multivibrator 40. As this re-triggerable monostable multivibrator 40 an integrated circuit "HD74LS123" is used in the embodiment which has A and B inputs and a Clear input. The A input is fixed to "L" and the B input is fixed to "H", and the Clear input is connected to a control terminal CON of the CPU 10. With the A and B inputs of the retriggerable monostable multivibrator 40 being fixed as described above, an "L" pulse signal is provided from the $\overline{Q}$ terminal when an "H" pulse signal is applied to the Clear input, whereas the level of the $\overline{Q}$ terminal transfers to "H" when an "L" pulse signal is applied to the Clear input. On the other hand, if the Clear input is held at "L" or "H", the $\overline{Q}$ terminal is kept in the "H" state.

The emitters of the transistors $Ql_1$–$Ql_m$ are connected in common with a driving voltage source +Vcc, and the collector of each transistor is connected in common with the anodes of the light emitting diodes of the corresponding row. The emitters of the transistors $Qr_1$–$Qr_n$ are connected in common and grounded, and the collector of each transistor is connected through a resistor, $R_1$–$R_n$, in common to the cathodes of the light emitting diodes of the corresponding column.

The operation of the matrix driver of the foregoing configuration according to the present invention will now be described.

The CPU 10 receives a pulse signal of a certain period from a pulse oscillator not shown and provides the row control signals $Sl_1$–$Sl_p$ and the column control signals $Sr_1$–$Sr_q$ so that in response to these control signals the individual light emitting diodes located at desired row-column positions within the diode matrix are successively caused to emit light one at a time. These control signals $Sl_1$–$Sl_p$ and $Sr_1$–$Sr_q$ are of the square waveform type.

Consider now the case of causing one diode $D_{22}$, for example, to emit light. This diode $D_{22}$ is positioned at the spot of 2nd row and 2nd column, so the row address must be "2" and the column address must be "2".

During the operation, the CPU 10 provides the row control signal $Sl_2$ and the column control signal $Sr_2$. Consequently, the signal input terminals $I_p, \ldots, I_2, I_1$ of the row address decoder 20 are supplied with address signals "O, . . . , 1, O"; thus, the row address decoder 20 decodes these address signals as "2" and provides the row signal $SL_2$ serving as the scanning signal from the signal output terminal $O_2$. Similarly, since the signal input terminals $I_q, \ldots, I_2, I_1$ of the column address decoder 30 are supplied with address signals "O, . . . , 1, O", the column address decoder 30 decodes these address signals as "2"0 and provides the column signal $SR_2$ serving as the scanning signal from the signal output terminal $O_2$.

However, during the non-scanning interval, the signal output terminals $O_1$–$O_m$ of the row address decoder 20 are held at "H", and the foregoing row signal $SL_2$ of 2nd row is now given in the form of an "L" signal. Therefore, the collector of the transistor $T_2$ is changed to "L" and it is turned on; thus, the base voltage of the driving transistor $Ql_2$ of 2nd row is changed to "L". Similarly, during the non-scanning interval, the signal output terminals $O_1$–$O_n$ of the column address decoder 30 are held at "L", and the foregoing column signal $SR_2$ of 2nd column is now given in the form of an "H" signal. On the other hand, the CPU 10 provides a pulse signal P of "H" level from its control terminal CON each time it provides the column signal, and this pulse signal P is supplied to the Clear input of the re-triggerable monostable multivibrator 40; thus, the $\overline{Q}$ terminal is changed to "L". As a result, the bases of the transistors $T'_1$–$T'_n$ are changed to "L". Consequently, the emitter of the transistor $T'_2$ is changed to "H" owing to the column signal $SR_2$ and it is turned on, then the base voltage of the driving transistor $Qr_2$ of 2nd column is changed to "H". Accordingly, there is formed a closed circuit passing through the positive voltage source +Vcc, the emitter-collector of the tansistor $Ql_2$, the diode $D_{22}$, the resistor $R_2$, the collector-emitter of the transistor $Qr_2$, and the ground, so that only one light emitting diode $D_{22}$ is energized to emit light.

The foregoing relates to the control operation for causing the diode $D_{22}$ to emit light. In the same way as the above, other diodes of the matrix can be controlled individually so as to emit light by the row control signals $Sl_1$–$Sl_p$ and the column control signals $Sr_1$–$Sr_q$ provided for the CPU 10.

During the operation, if either the pulse oscillator or the CPU 10 has become abnormal, the row signal $Sl_2$ and the column signal $Sr_2$, for example, are fixed to either "L" or "H". In such a case, the transistor $Ql_2$ of 2nd row and the transistor $Qr_2$ of 2nd column tend to be held in the conducting state to thereby cause the diode $D_{22}$ to emit light continuously.

In this embodiment, however, the Clear input of the re-triggerable monostable multivibrator 40 is connected with the control terminal CON of the CPU 10. Therefore, when either the pulse oscillator or the CPU 10 has become abnormal, the control terminal CON of the CPU 10 is fixed to either "L" or "H", as a result, the Clear input of the re-triggerable monostable multivibrator 40 is held at "L" or "H" and its $\overline{Q}$ terminal is maintained in the "H" state. Consequently, the transistors $T'_1$–$T'_n$ become the non-conducting state and all the driving transistors $Qr_1$–$Qr_n$ become the non-conducting state too. Accordingly, the other light emitting diodes D, as well as the light emitting diode $D_{22}$, cannot be energized and are prevented from becoming destroyed.

Figure 2:
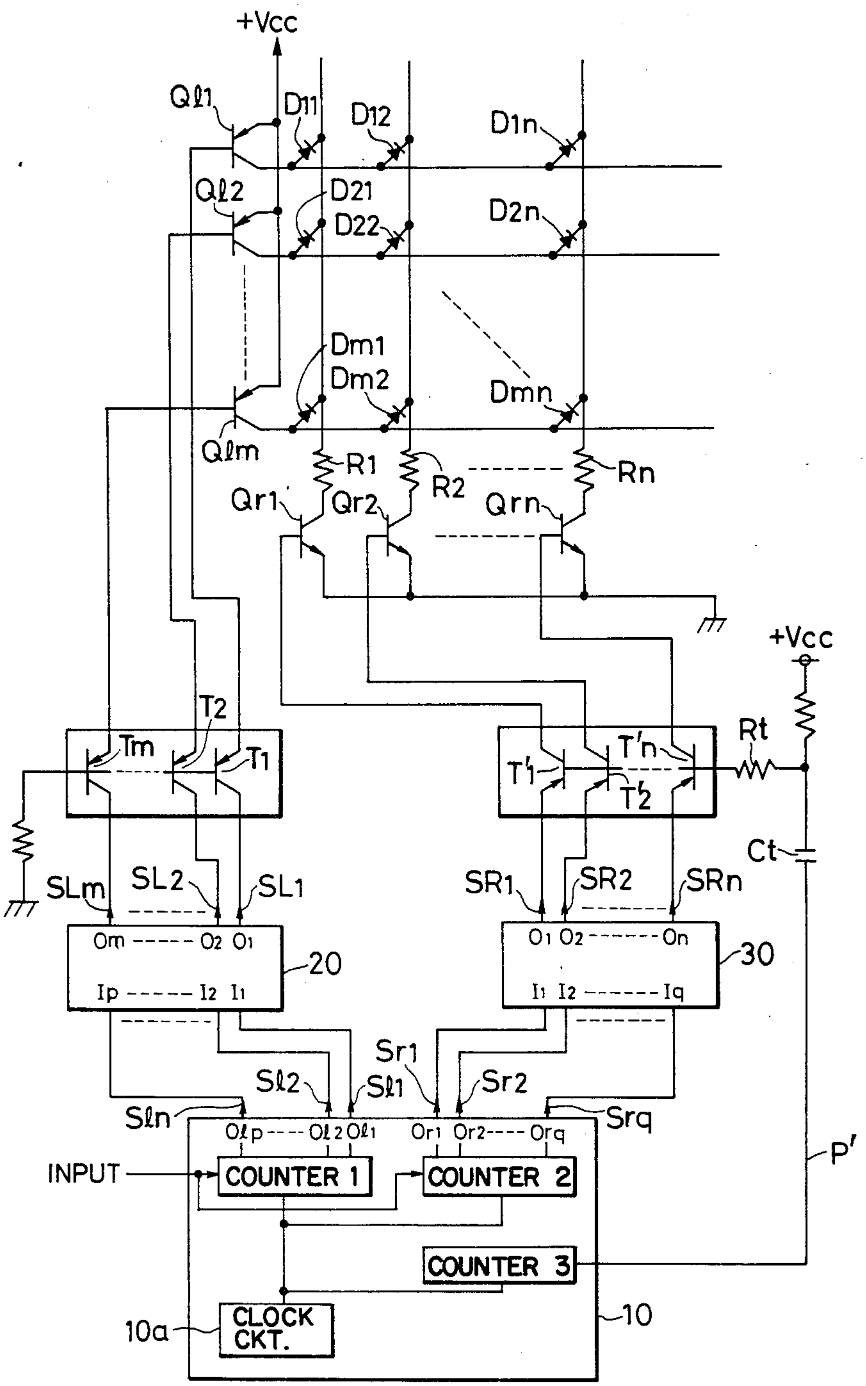
FIGS. 2 and 3 are circuit diagrams showing second and third embodiments, respectively, of the present invention.

FIG. 2 shows a second embodiment of the present invention. In this embodiment, a counter 1 and a counter 2 of the CPU 10 count a pulse signal given from the pulse oscillator not shown and provided individually the row control signals $Sl_1$–$Sl_p$ and the column control signals $Sr_1$ –$Sr_q$ each time of counting. A counter 3 of the CPU 10 provides a negative pulse signals P' each time a certain number of clock pulses are supplied from a clock circuit 10*a*. This negative pulse signal P' is applied through a condenser Ct and a resistor Rt to the bases of the transistors $T'_1$–$T'_n$. The time constant of these condenser Ct and resistor Rt is set equal to or larger than the period of the pulse signal P'. The bases of the transistors $T'_1$–$T'_n$ are applied through the resistor Rt with the source voltage +Vcc. For reference, the clock circuit 10*a* is used also as a means for synchronizing the respective counters.

Normally, in this embodiment, each time the row signals $SL_1$–$SL_n$ and the column signals $Sr_1$–$SR_n$ are provided from the row address decoder 20 and the column address decoder 30, the pulse signal P' is provided from the counter 3 of the CPU 10, and this pulse signal P' turns on the transistors $T'_1$–$T'_n$; thus, the light emitting diodes D are scanned successively to emit light.

During the operation, if either the pulse oscillator or the CPU 10 has become abnormal, the counter 3 of the CPU 10 is fixed to "L" or "H" and the source voltage +Vcc is continuously applied through the resistor Rt to the bases of the transistors $T'_1$–$T'_n$. Consequently, the transistors $T'_1$–$T'_n$ are made non-conductive, and thus, energization of all the light emitting diodes D is terminated in a similar manner to the foregoing.

Figure 3:
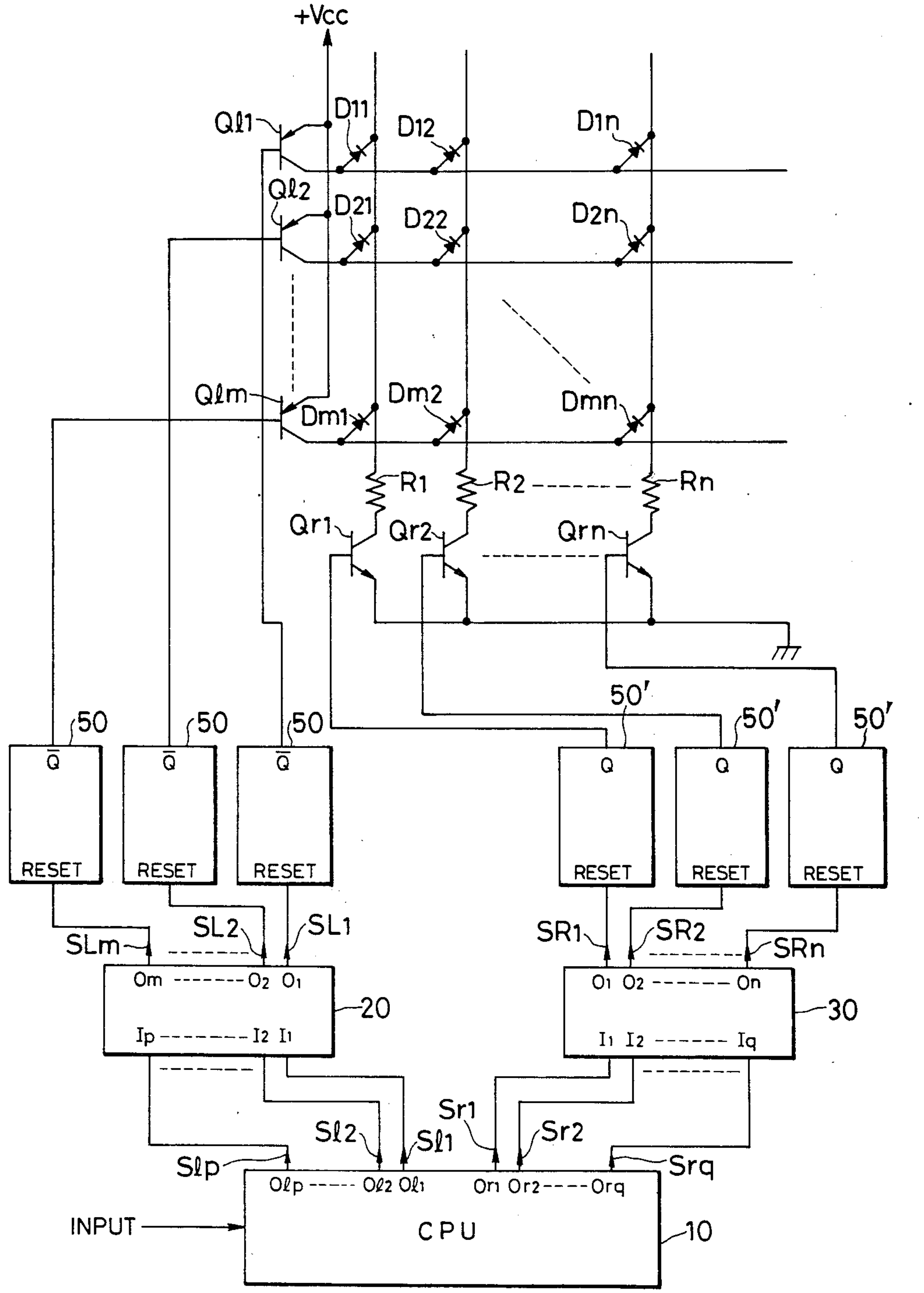
Figure 4:
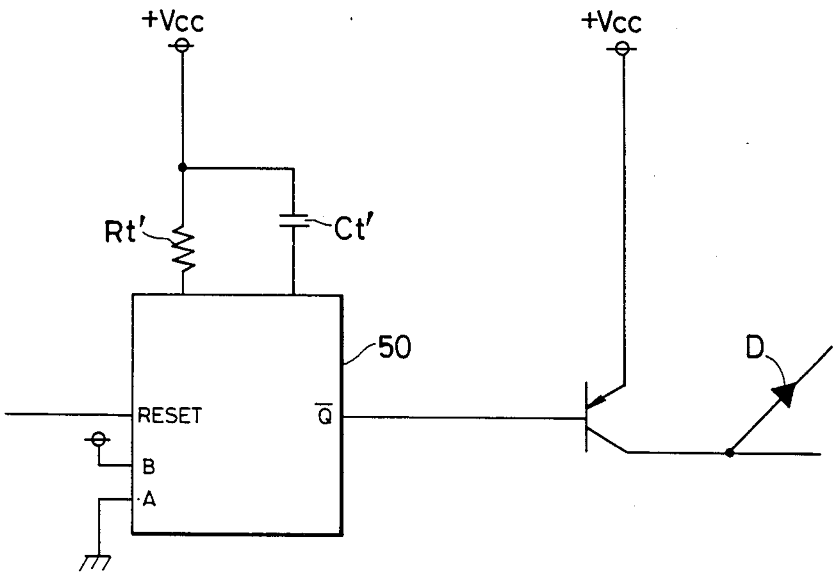
FIG. 4 is a diagram showing an example of a resetequipped multivibrator.

FIG. 3 shows a third embodiment of the present invention. In this embodiment, there are interposed reset-equipped one-shot multivibrators 50 between the signal output terminals $O_1$–$O_m$ of the row address decoder 20 and the driving PNP transistors $Ql_1$–$Ql_m$. Further, reset-equipped one-shot multivibrators 50′ are interposed between the signal output terminals $O_1$–$O_n$ of the column address decoder 30 and the driving NPN transistors $Qr_1$–$Qr_n$. The multivibrator 50 has, as shown in FIG. 4, a reset input to be connected with each signal output terminal of the row address decoder 20, and a $\overline{Q}$ terminal to be connected with the base of each PNP transistor, $Ql_1$–$Ql_m$. The time constant of a condenser Ct′ and a resistor Rt′ is set so that a negative pulse is provided from the Q terminal whose pulse duration is equal to or larger than that of the row signal. This reset-equipped multivibrator 50 provides a negative pulse from its $\overline{Q}$ terminal each time a negative pulse is applied to the reset input. Accordingly, when some row signal, for example, the row signal $SL_2$, of "L" level is provided from the row address decoder 20, a negative pulse is provided from the $\overline{Q}$ terminal of the corresponding resetequipped multivibrator 50 and the PNP transistor $Ql_2$ is turned on.

Similarly, the other reset-equipped multivibrator 50′ has a reset input to be connected with each signal output terminal of the column address decoder 30 and a Q terminal to be connected with the base of each NPN transistor, $QR_1$–$QR_n$, whose time constant on the output side is set in a similar manner to the above. This reset-equipped multivibrator 50′ provides a positive pulse from its Q terminal each time a positive pulse is applied to the reset input. Accordingly, if, for example, the column signal $SR_2$ of "H" level is provided form the column address decoder 30, a positive pulse is provided from the Q terminal of the corresponding reset-equipped multivibrator 50′ and the NPN transistor $QR_2$ is turned on. As a result, the light emitting diode $D_{22}$ is driven to emit light.

If either the pulse oscillator or the CPU 10 has become abnormal, the row signals $SL_1$–$SL_m$ and the column signal $Sr_1$–$SR_n$ come to a standstill; thus, all the $\overline{Q}$ terminals of the reset-equipped multivibrators 50 are held at "H" level, whereas all the Q terminals of the reset-equipped multivibrators 50′ are held at "L" level. Accordingly, the driving transistors $Ql_1$–$Ql_m$ and $Qr_1$–$Qr_n$ are maintained in the non-conducting state, and energization of all the diodes D is terminated.

For reference, in the embodiment shown in FIG. 3, the same effect can be attained by the use only of either group of reset-equipped multivibrators 50 or 50′.

Figure 5:
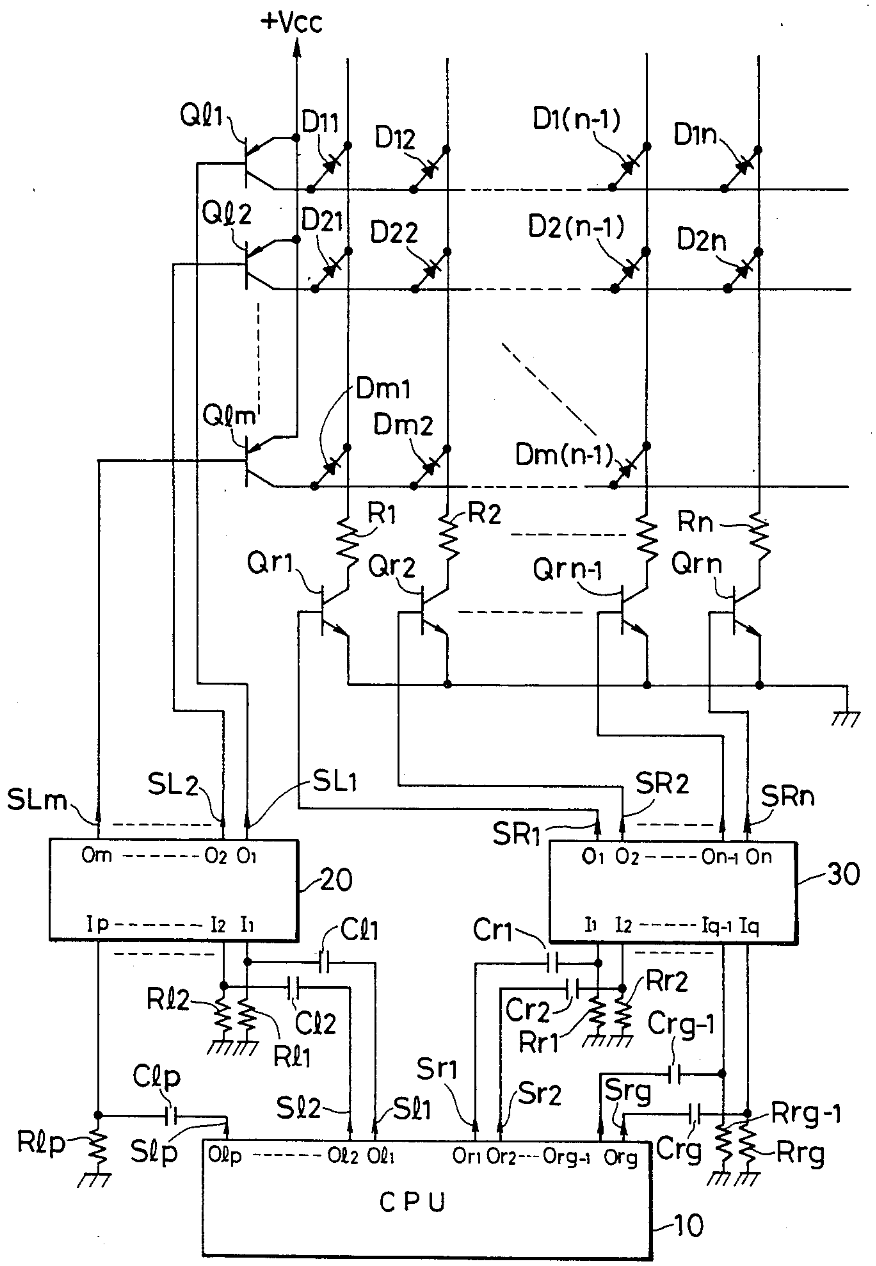
FIG. 5 is a circuit diagram showing a fourth embodiment of the present invention.

FIG. 5 shows a fourth embodiment of the present invention. In this drawing, the diode matrix comprises m rows and n columns and includes $(m \times n-1)$ light emitting diodes. Specifically, these light emitting diodes distributed are indicated by $D_{11}$–$D_{1n}$, $D_{21}$–$D_{2n}$, $D_{31}$–$D_{3n}$, . . . , $D_{ml}$–$D_{m(n-1)}$, and the position of $D_{mn}$ has no light emitting diode.

Signals for driving and controlling these light emitting diodes D are supplied through the CPU 10. Specifically, a plurality of row control signals $Sl_1$–$Sl_p$ are provided from the row signal output terminals $Ol_1$–$Ol_p$, and another plurality of column control signals $Sr_1$–$Sr_q$ are provided from the column signal output terminals $Or_1$–$Or_q$.

These row control signals $Sl_1$–$Sl_p$ are supplied through a plurality of condensers $Cl_1$–$Cl_p$ to the signal input terminals $I_1$–$I_p$ of the row address decoder 20, and the column control signals $Sr_1$–$Sr_g$ are supplied through a plurality of condensers $Cr_1$–$Cr_g$ to the signal input terminals $I_1$–$I_q$ of the column address decoder 30. The input terminals $I_1$–$I_p$ of the row address decoder 20 are grounded through resistors $Rl_1$–$Rl_p$, and the input terminals $I_1$–$I_q$ of the column address decoder 30 are grounded through resistors $Rr_1$–$Rr_q$.

The signal output terminals $O_1$–$O_m$ of the row address decoder 20 are connected to the bases of m PNP transistors $Ql_1$–$Ql_m$ for driving the row side of the diode matrix, thus supply the row signals $SL_1$–$SL_m$ thereto.

Similarly, the signal output terminals $O_1$–$O_n$ of the column address decoder 30 are connected to the bases of n NPN transistors $Qr_1$–$Qr_n$ for driving the column side of the diode matrix, thus supply the column signals $Sr_1$–$SR_n$ thereto.

The emitters of the transistors $Ql_1$–$Ql_m$ are connected in common with the driving voltage source +Vcc, and each collector is connected in common with the anodes of light emitting diodes of the corresponding row.

Similarly, the emitters of the transistors $Qr_1$–$Qr_n$ are grounded in common, and each collector is connected through a resistor, $R_1$–$R_n$, to the cathodes of light emitting diodes of the corresponding column in common.

The row address decoder 20 operates in such a manner that when a given row control signal is applied as the address signal it provides the row signals $SL_m$ from the signal output terminal $O_m$, and if no address signal is applied it also provides the row signal $SL_m$ from the signal output terminal $O_n$. Similarly, the column address decoder 30 operates in such a manner that when a given column control signal is applied as the address signal it provides the column signal $SR_n$ from the signal output terminal $O_n$, and if no address signal is applied it also provides the column signal $SR_n$ from the signal output terminal $O_n$.

The operation of the foregoing configuration will now be described.

The CPU 10 receives a pulse signal of a certain period from the pulse oscillator not shown and provides the row control signals $Sl_1$–$Sl_p$ and the column control signals $Sr_1$–$Sr_g$ so that in response to these control signals the individual light emitting diodes located at desired row-column positions within the diode matrix are successively caused to emit light one at a time. These control signals $Sl_1$–$Sl_p$ and $Sr_1$–$Sr_g$ are of the square waveform type.

Consider now the case of causing one diode $D_{22}$, for example, to emit light. This diode $D_{22}$ is positioned at the spot of 2nd row and 2nd column, so the row address must be "2" and the column address must be "2".

During the operation, the CPU 10 provides the row control signal $Sl_2$ and the column signal $Sr_2$. Consequently, the signal input terminals $I_p$, . . . , $I_2$, $I_1$ of the row address decoder 20 are supplied with address signals "O, . . . , 1, O"; thus, the row address decoder 20 decodes these address signals as "2" and provides the row signal $SL_2$ from the signal output terminal $O_2$. Similarly, since the signal input terminals $I_q$, . . . , $I_2$, $I_1$ of the column address decoder 30 are supplied with address signals "O, . . . , 1, O", the column address decoder 30 decodes these address signals as "2" and provides the column signal $SR_2$ from the signal output terminal $O_2$.

However, during the non-scanning interval, the signal output terminals $O_1$–$O_m$ of the row address decoder 20 are held at "H", and the foregoing row signal $SL_2$ of 2nd row is now given in the form of an "L" signal. Therefore, the base voltage of the driving transistor $Ql_2$ of 2nd row is changed to "L". Similarly, during the non-scanning interval, the signal output terminals $O_1$–$O_n$ of the column address decoder 30 are held at "L", and the foregoing column signal $SR_2$ of 2nd column is now given in the form of an "H" signal. Therefore, the base voltage of the driving transistor $Qr_2$ of 2nd column is changed to "H". Accordingly, there is formed a closed circuit passing through the positive voltage source +Vcc, the emittercollector collector of the transistor $Ql_2$, the diode $D_{22}$, the resistor $R_2$, the collector-emitter of the transistor $Qr_2$, and the ground, so that the two transistors $Ql_2$ and $Qr_2$ are turned on and only the diode $D_{22}$ is energized to emit light.

The foregoing relates to the control operation for causing the diode $D_{22}$ to emit light. In the same way as the above, other diodes of the matrix can be controlled individually so as to emit light by the row control signals $Sl_1$–$Sl_p$ and the column control signals $Sr_1$–$Sr_q$ provided from the CPU 10.

During the operation, if either the pulse oscillator or the CPU 10 has become abnormal, the row signal $Sl_2$ and the column signal $Sr_2$, for example, are fixed to either "L" or "H". In such a case, if the condensers $Cl_2$ and $Cr_2$ were not included, the row address decoder 20 and the column address decoder 30 are held in the foregoing abnormal state. As a result, the transistor $Ql_2$ of 2nd row and the transistor $Qr_2$ of 2nd column are held in the conducting state, so that the diode $D_{22}$ emits light continuously.

On the contrary, in this embodiment, the row control signals $Sl_1$–$Sl_p$ and the column control signals $Sr_1$–$Sr_q$ are supplied through the respective condensers to the decoders 20 and 30, respectively. Therefore, in the foregoing abnormal state, the row signal $Sl_2$ and the column signal $Sr_2$ are prevented from reaching the subsequent stages by both condensers $Cl_2$ and $Cr_2$. Specifically, two voltages to be applied to the individual signal input terminals $I_2$ of the two decoders 20 and 30 are varied by the time constant of the resistor $Rl_2$ and the condenser $Cl_2$ and the time constant of the resistor $Rr_2$ and the condenser $Cr_2$. Or, in accordance with these time constants the row control signal $Rl_2$ and the column control signal $Rr_2$ are changed smoothly from "H" to "L". Consequently, any part of the address signal does not become supplied to the row address decoder 20 and the column address decoder 30. As a result, the row signal $SL_m$ is provided from the signal output terminal $O_m$ of the row address decoder 20 and the column signal $SR_n$ is provided from the signal output terminal $O_n$ of the column address decoder 30, and the driving transistors $Ql_m$ and $Qr_n$ are turned on. Accordingly, at the abnormal time, the position of $D_{mn}$ within the diode matrix is surely scanned and since this position has no light emitting diode arranged there, destruction of any light emitting diode can surely be prevented.

Although the row control signals $Sl_1$–$Sl_p$ and the column control signals $Sr_1$–$Sr_q$ are supplied through the capacitive elements to either the address decoder 20 or 30, these elements may be replaced with monostable multivibrators. In the latter case, in response to the rising of each control signal each pulse signal of a certain duration is applied to the input terminal, $I_1$–$I_p$, $I_1$–$I_q$, of the decoder, 20, 30. Therefore, even if some control signal maintains its outputting state, no influence results after generation of one pulse; thus, it is possible to scan successively the $D_{mn}$ position having no light emitting diode, similarly to the other positions.

In this embodiment, it is also possible to define external row-column positions not included in the diode matrix. If so modified, when the row and column control signals are prevented from changing, thereby resulting in the abnormal state, these external row-column positions are designated by the two decoders 20 and 30.

According to the present invention, since the driving means for causing the light emitting diodes to emit light are deactivated when the scanning signals come to a standstill, the continued emission action of the light emitting diodes that would otherwise be caused owing to, for example, a trouble of the device can surely be prevented. Thus, there can be provided the matrix driver capable of causing the light emitting diodes to emit light stably over a long time.

Further, since the position where no light emitting diode exists is automatically designated when the signals for controlling the row and column have become abnormal, a peculiar light emitting diode can be prevented from emitting light continuously. Thus, there can be provided the matrix driver which does not destroy any diodes and shorten the lifetime.

I claim:

1. A matrix driver comprising:

a diode matrix composed of a plurality of light emitting diodes arranged in the form of a matrix;

scanning means for providing scanning signals to scan said plurality of light emitting diodes;

driving means for driving and causing the respective light emitting diodes to emit light in accordance with said scanning signals; and drive terminating means for supplying a drive terminating signal to said driving means when said scanning signals come to a standstill, wherein said drive terminating means is a monostable multivibrator having an input terminal connected to said scanning means which detects when said scanning signals come to a standstill and an output terminal connected to said driving means for providing said drive terminating signal thereto.

2. A matrix driver according to claim 1, wherein said driving means includes a plurality of row driving elements, each of which is connected to one end of each of the light emitting diodes in a corresponding row, and a plurality of column driving elements, each of which is connected to another end of each of the light emitting diodes in a corresponding column, and wherein one of said plurality of row driving elements and plurality of column driving elements have respective base terminals thereof connected to said output terminal of said monostable multivibrator for shutting off said plurality of driving elements when the standstill state of the scanning signals is detected.

* * * * *